US009367351B1

(12) United States Patent
Yang et al.

(10) Patent No.: US 9,367,351 B1
(45) Date of Patent: Jun. 14, 2016

(54) PROFILING INPUT/OUTPUT BEHAVIORAL CHARACTERISTICS IN DISTRIBUTED INFRASTRUCTURE

(71) Applicant: EMC Corporation, Hopkinton, MA (US)

(72) Inventors: Ziye Yang, Shanghai (CN); David Black, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 232 days.

(21) Appl. No.: 13/804,327

(22) Filed: Mar. 14, 2013

(51) Int. Cl.
*G06F 9/48* (2006.01)
*G06F 11/34* (2006.01)
*G06F 3/06* (2006.01)

(52) U.S. Cl.
CPC ............ *G06F 9/4881* (2013.01); *G06F 3/0653* (2013.01); *G06F 11/3485* (2013.01); *G06F 3/061* (2013.01)

(58) Field of Classification Search
CPC ...................................................... G06F 9/4881
USPC ............................................ 718/102; 710/18
See application file for complete search history.

(56) References Cited

U.S. PATENT DOCUMENTS

| | | | | |
|---|---|---|---|---|
| 6,978,259 B1 * | 12/2005 | Anderson | ............. | G06F 3/0605 706/19 |
| 7,152,142 B1 * | 12/2006 | Guha et al. | .................... | 711/114 |
| 7,739,470 B1 * | 6/2010 | Norgren | .............. | G06F 11/3485 709/224 |
| 8,949,483 B1 * | 2/2015 | Martin | .................. | G06F 3/0653 710/15 |
| 2003/0028583 A1 * | 2/2003 | Flores et al. | .................. | 709/105 |
| 2005/0050270 A1 * | 3/2005 | Horn | ..................... | G06F 3/0608 711/114 |
| 2005/0066326 A1 * | 3/2005 | Herbeck | ............. | G06F 11/3409 718/100 |
| 2007/0011660 A1 * | 1/2007 | Garyali et al. | ................ | 717/127 |
| 2007/0088861 A1 * | 4/2007 | Dudley et al. | ................... | 710/15 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Abdullah Al Kawsar
(74) *Attorney, Agent, or Firm* — Ryan, Mason & Lewis, LLP

(57) ABSTRACT

Techniques for profiling input/output (I/O) characteristics in a computing system implemented with distributed infrastructure. In one example, a method comprises the following steps. Behavioral characteristics are extracted for a set of factors associated with a targeted system in a distributed infrastructure by causing execution of one or more input/output workloads in accordance with one or more entities and the targeted system. At least a portion of the extracted behavioral characteristics is utilized to determine whether one or more subsequent workloads satisfy one or more quality-of-service criteria when executed in accordance with at least one of the one or more entities and the targeted system.

20 Claims, 4 Drawing Sheets

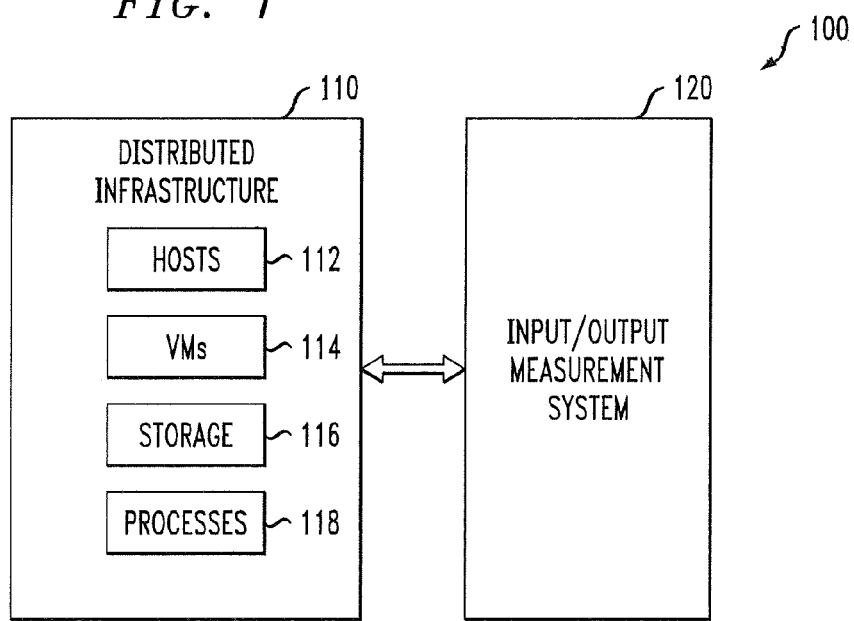
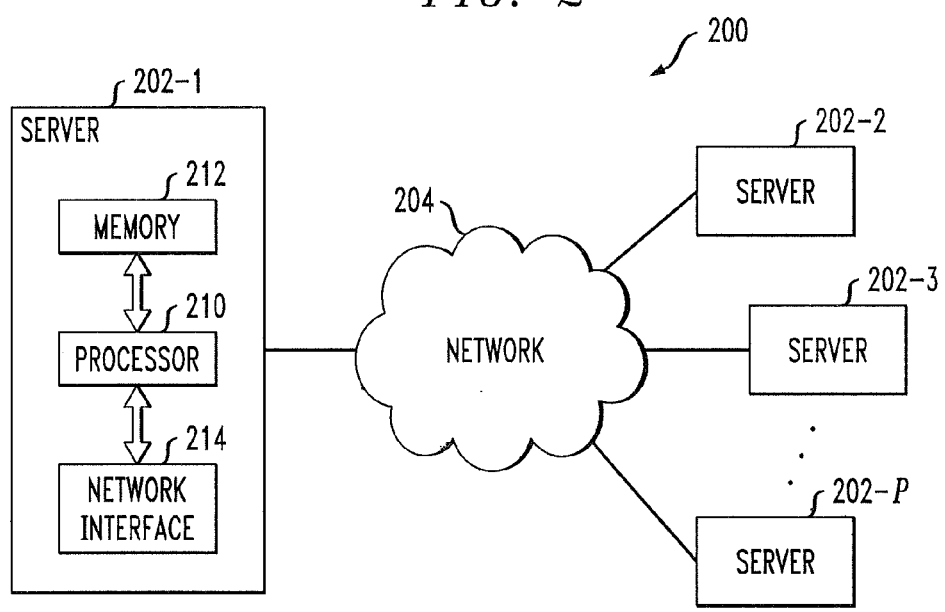

Participators: N entities, i.e., E1, E2, ... , En
Output:
    Representative workload class (RWC)
    Workload generation rules (WGR)
Initialization:
401 —— RWC= ∅, WGR = ∅.

Execution process for M rounds (M can be predefined)
For I from 0 to M-1
Do
402 —— 1) Assign $S_{IOB}$ values based on the WGR set.
404 —— 2) Execute the resulting I/O workloads and store the results.
406 —— 3) Analyze the results to generate the characteristics of $S_{KF}$, then derive the new workload generation rules (NWGR) and merge the rules with the old ones, i.e., WGR = WGR ∪ {NWGR}.
408 —— 4) Analyze the results to judge whether $S_{IOB}$ result in a new type of representative workload.
      • If resulting a new one, we construct a new RWC (NRWC)
      • RWC= RWC ∪ {NRWC}
End

FIG. 5

```
Participators: N entities, i.e., E1, E2, ... , En
Input:
    The specific workload: S_IOB
Output:
The Assignment of S_KF which results in the satisfied QOS
Execution process for M rounds (M can be predefined, which should
not exceed the assignment space of S_KF)
For I from 0 to M-1
Do
    1) Get the assignment of S_KF
    2) Predict the performance results of S_IOB on S_KF, and record it.
    3) If the results are satisfied with the requirements, this assignment
       of S_KF is a good candidate. We can stop the iterative loop.
    4) If not, we compare whether the current performance results are
       better than before (means the previous ones). If such assignment
       is better, we can determine the value assignments of some KFs in
       S_KF, and only change the assignment of remaining factors.
End
```

PROFILING INPUT/OUTPUT BEHAVIORAL CHARACTERISTICS IN DISTRIBUTED INFRASTRUCTURE

FIELD

The field relates to computing systems implemented with a distributed infrastructure, and more particularly to techniques for profiling input/output (I/O) behavioral characteristics in such a computing system implemented with a distributed infrastructure.

BACKGROUND

It is not uncommon for a distributed infrastructure to be implemented on a computing platform that includes tens to hundreds of physical processing elements. Thus, input/output (I/O) measurement can be a challenging task and, as such, the task of improving workload efficiency in the distributed infrastructure can be equally if not more difficult.

These issues can also pose a problem when the distributed infrastructure is part of a computing system maintained and managed by an infrastructure provider entity as part of a chargeable service. In such a scenario, the provider entity typically has tenants (users of the service and infrastructure) who expect compliance with service level agreements (SLAs) that are agreed upon between the provider entity and the tenants in order to guarantee specific performance and security criteria, i.e., quality-of-service (QoS) requirements. As such, both the tenant and the provider entity have an interest in seeing an improvement in the performance efficiency of I/O workloads so as to improve QoS delivery.

SUMMARY

Embodiments of the invention provide techniques for determining (e.g., profiling) input/output (I/O) behavioral characteristics in a computing system implemented with distributed infrastructure. Embodiments then use these behavioral characteristics to improve subsequent workload efficiency.

In one embodiment, a method comprises the following steps. Behavioral characteristics are extracted for a set of factors associated with a targeted system in a distributed infrastructure by causing execution of one or more input/output workloads in accordance with one or more entities and the targeted system. At least a portion of the extracted behavioral characteristics is utilized to determine whether one or more subsequent workloads satisfy one or more quality-of-service criteria when executed in accordance with at least one of the one or more entities and the targeted system.

In another embodiment, a computer program product is provided which comprises a processor-readable storage medium having encoded therein executable code of one or more software programs. The one or more software programs when executed by at least one processing element of a computer system implement steps of the above-described method.

In yet another embodiment, an apparatus comprises a memory and a processor operatively coupled to the memory and configured to perform steps of the above-described method.

In a further embodiment, a controller and an analysis module are operatively coupled and configured to perform steps of the above-described method.

Advantageously, embodiments described herein provide techniques for implementing an I/O measurement tool based on a characterization of QoS behavior and QoS measurement and prediction. I/O workloads and the corresponding QoS results can be used to improve the system design for better QoS delivery.

These and other features and advantages of the present invention will become more readily apparent from the accompanying drawings and the following detailed description.

BRIEF DESCRIPTION OF THE DRAWINGS

FIG. 1 illustrates distributed infrastructure and an input/output measurement system in accordance with one embodiment of the invention.

FIG. 2 illustrates a processing platform on which the distributed infrastructure and the input/output measurement system of FIG. 1 are implemented in accordance with one or more embodiments of the invention.

FIG. 4 illustrates a portion of an input/output measurement methodology in accordance with one embodiment of the invention.

FIG. 5 illustrates another portion of an input/output measurement methodology in accordance with one embodiment of the invention.

DETAILED DESCRIPTION

Figure 3:
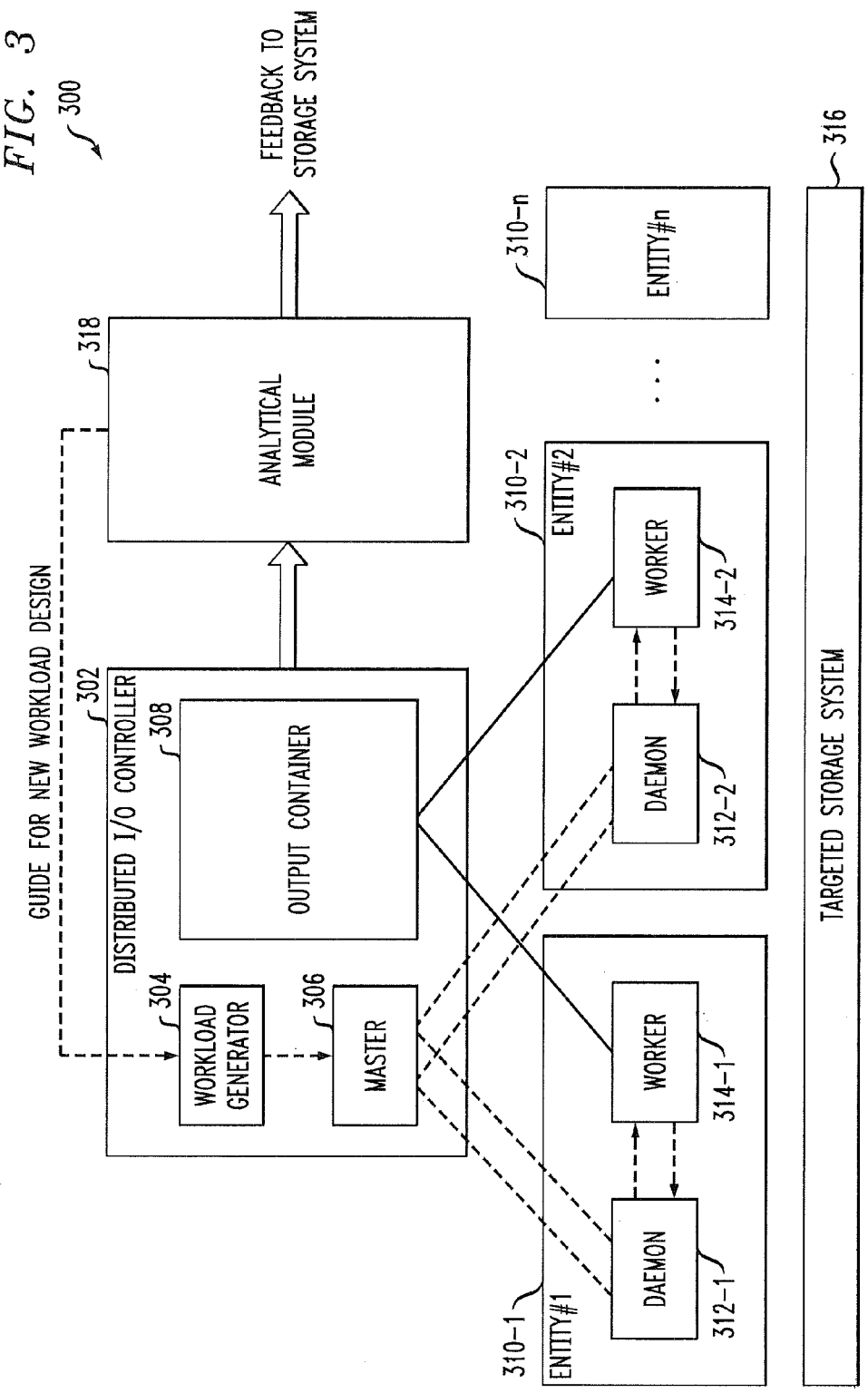
FIG. 3 illustrates an input/output measurement system environment in accordance with one embodiment of the invention.

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Further, as used herein, the phrase "distributed infrastructure" refers to a computing environment with distributed execution components. The term "distributed" is intended to broadly mean functionally separated, and not necessarily geographically or physically separated, although this could be the case for a given embodiment. The distributed infrastructure can include a non-virtual computing environment comprised of physical execution components (e.g., hosts and storage arrays). Alternatively, the distributed infrastructure can include a virtual computing environment comprised of logical execution components (e.g., virtual machines and logical storage units under control of one or more hypervisors) executing on top of physical execution components (e.g., hosts and storage arrays). Thus, embodiments of the invention are not limited to any particular type of distributed computing environment.

FIG. 1 shows a system 100 configured in accordance with an illustrative embodiment of the present invention. The system 100 comprises distributed infrastructure 110 and an input/output (I/O) measurement system 120. As will be explained in detail below, the I/O measurement system 120 profiles characteristics of various factors (e.g., I/O scheduling algorithms, cache policy, network, etc.) associated with the distributed infrastructure 110 in order to guide the design of representative I/O workloads for use in understanding the QoS behavior of one or more particular components of the distributed infrastructure. Then, QoS measurements can be performed based on the profiled characteristics to identify workloads that can cause the one or more particular components of the distributed infrastructure to fail to meet QoS requirements. The representative I/O workloads and the corresponding QoS results can then be used to improve the design of the distributed infrastructure for better QoS delivery.

Note that reference to the term "I/O" as used herein should be understood as storage related I/O. Distributed infrastructure 110 is illustratively depicted in the figure as comprising an execution environment with execution components comprising one or more hosts 112, one or more virtual machines (VMs) 114, and storage devices 116 (upon which logical units (LUs) can be implemented) that execute one or more processes 118 that perform computation. It is to be understood that while distributed infrastructure 110 illustratively shows logical execution components such as VMs, the infrastructure may alternatively have no virtualized components at all.

Although system elements 110 and 120 are shown as separate elements in FIG. 1, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the distributed infrastructure 110 may be implemented on a first processing device of a first processing platform and the I/O measurement system 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

An example of a processing platform on which the distributed infrastructure 110 and/or the I/O measurement system 120 of FIG. 1 may be implemented is processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may comprise electronic memory such as random access memory (RAM), read-only memory (ROM) or other types of memory, in any combination. The server 202-1 may execute what is more generally referred to herein as a "computer program product." A computer program product comprises a processor-readable storage medium (which is a non-transitory medium) having encoded therein executable code of one or more software programs. The computer program code when executed by a processing device such as the server 202-1 causes the device to perform functions associated with one or more of the elements of system 100. One skilled in the art would be readily able to implement such software given the teachings provided herein. Examples of computer program products embodying embodiments of the invention may include, for example, optical or magnetic disks.

Also included in the server 202-1 is network interface circuitry 214, which is used to interface the server with the network 204 and other system components. Such circuitry may include conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 200 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Illustrative details of the I/O measurement system 120, as well as operations of elements of system 120 will now be described with reference to FIGS. 3 through 5. It is to be understood that the illustrative descriptions below assume that the distributed infrastructure is implementing a data storage system. As such, embodiments are directed to measurement of storage I/O QoS behavior. However, alternative embodiments can be directed to systems other than data storage systems in a straightforward manner.

Generally, storage I/O QoS is difficult to measure, especially in multi-tenant scenarios (e.g., when a service provider provides storage services to multiple tenants using a shared set of execution components of the distributed infrastructure) due to variations among workloads, requiring significant efforts and time to conduct simulation experiments in order to characterize storage system behavior. To mitigate or eliminate such issues, embodiments of the invention provide a distributed I/O measurement framework configured to control several entities to execute coordinated I/O workloads and store the results. For example, the individual workloads represent individual tenants (i.e., the consumers of the target data storage system). Also, embodiments of the invention exploit characteristics of I/O services within the data storage system and representative workloads through iterative profiling, the results of which are applied to the design of the data storage system in order to improve its QoS behavior.

FIG. 3 illustrates an I/O measurement system environment in accordance with one embodiment of the invention. As shown, the I/O measurement system 300, itself, includes a distributed I/O controller 302 with a workload generator 304, a master module 306, and an output container 308. The system 300 also includes an analytical module 318. As further shown, the system 300 includes a plurality of entities 310-1, 310-2, . . . , 310-n (collectively referred to as "310"), each with a respective daemon component 312-1, 312-2, . . . , 312-n (collectively referred to as "312") and a respective worker component 314-1, 314-2, . . . , 314-n (collectively referred to as "314") resident thereon. Each entity is executed in conjunction with a targeted storage system 316. It is to be appreciated that the entities 310 and targeted storage system 316 are not part of the measurement system 300 but rather are part of the distributed infrastructure being profiled by the I/O measurement system 300. Examples of an entity include, but are not limited to, a VM, a host (i.e., physical processing device that executes one or more VMs), and a process group. Entities 310-1, 310-2, . . . , 310-n may all be the same type of entity or a mix of different types of entities. The targeted storage system 316 comprises one or more storage arrays (e.g., Redundant Arrays of Independent Disks or RAIDs).

When the measurement begins, the master module 306 in the distributed I/O controller 302 interacts with the daemons 312 within one or more of the entities 310-1, 310-2, . . . , 310-n and directs each daemon 312 to execute designated I/O tasks generated by the workload generator 304. Then, the outputs produced by each worker 314 (spawned by the daemon 312) are stored in the output container (e.g., a database) 308. Note that a given daemon can spawn more than one worker component in an entity. The distributed I/O controller 302 then delivers the execution results to the analytical module 318 for knowledge extraction. After iterative workload execution and analysis, the characteristics of each factor are extracted.

Generally, the QoS delivered by the storage arrays of the targeted storage system 316 can be divided into several performance measurement standards, e.g., IOPS (input/output operations per second), bandwidth, execution time latency, etc. These standards can be considered as QoS requirements, e.g., the storage server needs to stably commit a given number of IOPS (e.g., ranged from 500 to 700) to a VM with database workloads in multi-tenant environments. The deviation of QoS commitment to an entity can be understood as the violation of such detailed performance measurement standards.

More particularly, the quality of I/O service provided depends on multiple key factors (KFs) in the targeted storage system 316, e.g., I/O scheduling algorithm, I/O cache replacement policy, network control component, etc. Each factor influences the QoS delivery in a different manner. Formally, the QoS delivery in a storage system for n concurrent entities (i.e., E1, E2, . . . , En) can be expressed by a function that yields the performance for each entity ($P_{Ei(1<=i<=n)}$):

$(P_{E1}, P_{E2}, \ldots, P_{En}) = F_{QOS}(S_{KF}, S_{IOB})$

In this function:

$S_{KF}$ is a set that contains all the KFs in the storage system, i.e., $S_{KF} = \{KF_1, K_{F2}, KF_3, \ldots\}$ $S_{IOB}$ is a set that contains all the possible I/O behaviors of participating entities, i.e., $S_{IOB} = \{E1_{IOB}, E2_{IOB}, \ldots, En_{IOB}\}$ $P_{Ei}$ is the resulting performance for entity Ei.

To characterize the QoS behavior of the targeted storage system 316, the distributed I/O controller 308 first profiles the characteristics of $S_{KF}$. After the iterative rounds of profiling, a series of rules are derived from the profiled characteristics, which are used to guide the design of new workloads and predict the behavior of the storage system 316 for other workloads. Thus, the measurement time is reduced, since the individual configuration of each participating entity is compared, and the potential results are estimated, as will be further explained below.

Accordingly, the functionality of I/O measurement system 300 can be considered as operating in two phases: (1) QoS behavior characterization; and (2) QoS measurement and prediction.

QoS Behavior Characterization Phase

In this phase, an analytical process is applied to extract the characteristics of $S_{KF}$ in the targeted storage system. More particularly, an iterative process is used based on changing workloads to characterize the QoS behavior of the targeted storage system without any requirements as part of the input. The QoS behavior characterization phase is as follows:

(1) Several entities 310 (e.g., hosts or VMs) are selected to connect to the targeted storage system 316, which are controlled under the distributed I/O controller 308 to carry out the designated I/O workloads (fixed assignment of $S_{IOB}$) in each round, as shown in methodology 400 in FIG. 4:

After initialization (step 401);

Step 402: Assign $S_{IOB}$ values based on the Workload Generation Rules (WGR) set;

Step 404: Execute the resulting I/O workloads and store the results;

Step 406: Analyze the results to generate the characteristics of $S_{KF}$, then derive the new workload generation rules (NWGR) and merge the rules with the old ones, i.e., WGR=WGR∪{NWGR}; and Step 408: Analyze the results to judge whether $S_{IOB}$ result in a new type of representative workload:

If result is a new type of representative workload, a new Representative Workload Class (NRWC) is constructed;

Then RWC=RWC∪{NRWC}

(2) After each round's execution, the characteristics of $S_{KF}$ are estimated based on one or more well-known timing analytical algorithms and statistical models, and workload generation rules (WGRs) are suggested that guide the selection of additional workload combinations to refine that characterization. This means that new and effective assignments of $S_{IOB}$ can be guided for the next round of characterization. By way of example, assume the targeted KF is an I/O scheduling algorithm of a storage system. Suppose 4 hosts (named as 0,1,2,3) are used as the entities which connect to the storage system, each host executes the same $E_{IOB}$, which sequentially conducts the write I/Os to their own allocated storage space, then the system collects all time execution results of these I/O tasks (e.g., the beginning time and the end time). According to their execution time, the system applies algorithms to conduct the analytical work. For instance, the system can sort the results with the timing sequence to track the I/O fairness, if it is found that the I/O service pattern is (0,1,2,3) (by way of example only), the system may obtain a rule that the storage system uses a FIFO (first-in-first-out) model to serve the entities. With more rounds, more rules can be obtained. Those rules can help to partition the types of workloads.

(3) After the current round's execution, it is determined whether the assignment of $S_{IOB}$ results in a new representative workload class (RWC).

After multi-rounds' execution and analysis (note that the number of rounds is set by experience or context, by way of example only, there could be 100 rounds if context and experience warranted such), the characterization is sufficiently stable with the obtained WGRs and the classification of workloads (RWCs). Thus, it is not necessary to measure all kinds of workloads ($S_{IOB}$) in a brute-force manner. As with the WGR, the workloads can be classified, thus the homogenous workloads (belonging to the already existing RWCs) need not be actually measured.

QoS Measurement and Prediction Phase

In the previous phase, the QoS behaviors of the targeted storage system 316 are characterized, i.e., the behavior of the $F_{QoS}(S_{KF}, S_{IOB})$ function is identified. Then, for a specific set of user/tenant workload entities with QoS requirements, the obtained $F_{Qos}$ is used to predict the performance of designated workloads and specifically to measure whether the QoS requirements can be met or not. For example, if the committed QoS of an entity (e.g., $P_E$ for entity E) fails from prediction, then such a workload assignment can be fed back to the targeted storage system as a potential case for further diagnosis, i.e., to improve the behaviors of $S_{KF}$.

More specifically, methodology 500 in FIG. 5 shows the iterative process of $S_{KF}$ adjustment for QoS improvement. For each round, the following steps are performed:

Step 502: Get the assignment of $S_{KF}$;

Step 504: Predict the performance results of $S_{IOB}$ on $S_{KF}$, and record it; and Step 506: If the results are satisfied with the requirements, this assignment of $S_{KF}$ is a good candidate, therefore, stop the iterative loop.

Step 508: If not, compare whether the current performance results are better than previous ones. If such assignment is better, determine the value assignments of some KFs in $S_{KF}$, and only change the assignment of remaining factors.

It is to be appreciated that one or more well-known hill climbing type algorithms can be applied to find optimal configurations of $S_{KF}$ in the targeted storage system. For example, as described above, there are many $S_{KF}$ sets in the storage system. The hill climbing algorithm can only help to find the local maximal values of the storage system. For example, assume we want to find a representative workload by an entity which could violate the I/O QoS of the storage system (assuming the assigned maximal quota is 500 IOPS). The entity can construct the I/O jobs with 4 parameters, i.e., I/O size, read/write percentage, sequential percentage, and the I/O issue frequency. Then, the 4 different parameters can be adjusted, however, the number combinations of parameters is large. So it may be decided to fix the value of 3 parameters and adjust one parameter. Then, a best value of the variable parameter (local best value) is determined. With the same method, the best values of the 4 parameters can be found, but the combination of the 4 is not the best one.

Accordingly, embodiments of the invention consider the QoS delivery in a systematical view that covers the ranges of the key factors in the storage system. This is because of the realization that factors may influence each other, and thus there can be synthesized effects. More specifically, the I/O measurement systems and methodologies described herein iteratively profile the characteristics of the key factors for guiding and classifying the workloads. The measurement system carries out representative workloads to deduce and utilize the properties of the KFs in the storage system. Then, the measurement of QoS is more meaningful and effective, which gives useful feedback to the storage system for the next round of design and implementation. Moreover, the system predicts the behaviors of the given workloads, which significantly reduces the measurement time.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
extracting behavioral characteristics for a set of factors associated with a targeted system in a distributed infrastructure by causing execution of one or more input/output workloads by one or more workers within one or more entities in the distributed infrastructure operatively coupled to the targeted system, wherein the targeted system comprises a data storage system that is accessed during execution of the one or more input/output workloads and each entity of the one or more entities comprises an execution control component that receives the one or more input/output workloads generated by a workload generator and the execution control component executes the one or more workloads utilizing the one or more workers, and wherein the step of extracting behavioral characteristics for the set of factors associated with the targeted system further comprises causing execution of the one or more input/output workloads by the one or more workers in an iterative process comprising a plurality of iterations, and wherein the iterative process for a given iteration further comprises:
assigning potential behavioral characteristics for the set of factors associated with the targeted system based on a workload generation rule set;
causing execution of the one or more input/output workloads as per the assignment step;
analyzing at least a portion of the execution results;
generating an updated workload generation rule set based on the analysis step; and
generating one or more new input/output workloads based on the updated workload generation rule set for execution in the next iteration; and
predicting whether one or more subsequent input/output workloads satisfy one or more quality-of-service criteria when executed by the one or more workers of at least one of the one or more entities utilizing at least a portion of the extracted behavioral characteristics;
wherein the set of factors comprises factors which influence quality-of-service delivery associated with the execution of the one or more input/output workloads;
wherein the extracting and predicting steps are performed on at least one processing element.

2. The method of claim 1, wherein the set of factors comprises one or more of an input/output scheduling algorithm, an input/output cache replacement policy, and a network control component.

3. The method of claim 1, wherein the iterative process for a given iteration further comprises constructing one or more new representative workload classes for the one or more new input/output workloads.

4. The method of claim 3, wherein the iterative process for a given iteration further comprises combining the one or more new representative workload classes with a set of existing representative workload classes.

5. The method of claim 1, wherein the step of utilizing at least a portion of the extracted behavioral characteristics is performed in an iterative process comprising one or more iterations.

6. The method of claim 5, wherein the iterative process for a given iteration further comprises:
assigning values to the set of factors; and
predicting performance results of the extracted behavioral characteristics for the set of factors based on the assignment step.

7. The method of claim 6, wherein the iterative process for a given iteration further comprises using assigned values when the one or more quality-of-service criteria are met.

8. The method of claim 6, wherein the iterative process for a given iteration further comprises assigning new values to at least a portion of the factors when the one or more quality-of-service criteria are not met.

9. The method of claim 1, wherein the one or more entities are at least one of logical entities and physical entities.

10. A computer program product comprising a processor-readable storage medium having encoded therein executable code of one or more software programs, wherein the one or more software programs when executed by the at least one processing element of the computing system implement the steps of the method of claim 1.

11. The method of claim 1, wherein the one or more entities comprise at least one of a virtual machine, a host, and a process group operatively coupled to the data storage system.

12. The method of claim 1, wherein the one or more entities are shared between multiple tenants of the distributed infrastructure.

13. The method of claim 12, wherein the one or more subsequent input/output workloads in the utilizing step respectively correspond to one or more tenants of the multiple tenants.

14. An apparatus comprising:
at least one memory; and
at least one processor operatively coupled to the at least one memory and configured to:
extract behavioral characteristics for a set of factors associated with a targeted system in a distributed infrastructure by causing execution of one or more input/output workloads by one or more workers within one or more entities in the distributed infrastructure operatively coupled to the targeted system, wherein the targeted system comprises a data storage system that is accessed during execution of the one or more input/output workloads and each entity of the one or more entities comprises an execution control component that receives the one or more input/output workloads generated by a workload generator and the execution control component executes the one or more workloads utilizing the one or more workers, and wherein the step of extracting behavioral characteristics for the set of factors associated with the targeted system further comprises causing execution of the one or more input/output workloads by the one or more workers in an iterative process comprising a plurality of iterations, and wherein the iterative process for a given iteration further comprises:
assigning potential behavioral characteristics for the set of factors associated with the targeted system based on a workload generation rule set;
causing execution of the one or more input/output workloads as per the assignment step;
analyzing at least a portion of the execution results;
generating an updated workload generation rule set based on the analysis step; and
generating one or more new input/output workloads based on the updated workload generation rule set for execution in the next iteration; and
predict whether one or more subsequent input/output workloads satisfy one or more quality-of-service criteria when executed by the one or more workers of at least one of the one or more entities utilizing at least a portion of the extracted behavioral characteristics;
wherein the set of factors comprises factors which influence quality-of-service delivery associated with the execution of the one or more input/output workloads.

15. The apparatus of claim 14, wherein the utilization of at least a portion of the extracted behavioral characteristics is performed in an iterative process comprising one or more iterations, wherein the iterative process for a given iteration further comprises:
assigning values to the set of factors; and
predicting performance results of the extracted behavioral characteristics for the set of factors based on the assignment step.

16. The apparatus of claim 14, wherein the one or more entities comprise at least one of a virtual machine, a host, and a process group operatively coupled to the data storage system.

17. The apparatus of claim 14, wherein the one or more entities are shared between multiple tenants of the distributed infrastructure.

18. A system comprising:
a processor and a memory operatively coupled to the processor;
a controller configured to cause execution of one or more input/output workloads by one or more workers within one or more entities in the distributed infrastructure operatively coupled to a targeted system in a distributed infrastructure, wherein the targeted system comprises a data storage system that is accessed during execution of the one or more input/output workloads and each entity of the one or more entities comprises an execution control component that receives the one or more input/output workloads generated by a workload generator and the execution control component executes the one or more workloads utilizing the one or more workers; and
an analysis module operatively coupled to the controller and configured to:
extract behavioral characteristics for a set of factors associated with the targeted system, wherein the step of extracting behavioral characteristics for the set of factors associated with the targeted system further comprises causing execution of the one or more input/output workloads by the one or more workers in an iterative process comprising a plurality of iterations, and wherein the iterative process for a given iteration further comprises:
assigning potential behavioral characteristics for the set of factors associated with the targeted system based on a workload generation rule set;
causing execution of the one or more input/output workloads as per the assignment step;
analyzing at least a portion of the execution results;
generating an updated workload generation rule set based on the analysis step; and generating one or more new input/output workloads based on the updated workload generation rule set for execution in the next iteration; and predict whether one or more subsequent input/output workloads satisfy one or more quality-of-service criteria when executed by the one or more workers of at least one of the one or more entities utilizing at least a portion of the extracted behavioral characteristics;

wherein the set of factors comprises factors which influence quality-of-service delivery associated with the execution of the one or more input/output workloads;

wherein the controller and the analysis module are implemented as part of the processor and the memory.

19. The system of claim 18, wherein the one or more entities comprise at least one of a virtual machine, a host, and a process group operatively coupled to the data storage system.

20. The system of claim 18, wherein the one or more entities are shared between multiple tenants of the distributed infrastructure.

* * * * *